(12) United States Patent
Wygnanski

(10) Patent No.: US 8,006,952 B2
(45) Date of Patent: Aug. 30, 2011

(54) LOW POWER ACTUATOR AND VALVE-ACTUATOR COMBINATION

(75) Inventor: Wladyslaw Wygnanski, Cambridge (GB)

(73) Assignee: Camcon Limited (GB)

( * ) Notice: Subject to any disclaimer, the term of this patent is extended or adjusted under 35 U.S.C. 154(b) by 823 days.

(21) Appl. No.: 11/577,752

(22) PCT Filed: Oct. 31, 2005

(86) PCT No.: PCT/GB2005/004194
§ 371 (c)(1),
(2), (4) Date: Feb. 18, 2008

(87) PCT Pub. No.: WO2006/048616
PCT Pub. Date: May 11, 2006

(65) Prior Publication Data
US 2009/0206290 A1    Aug. 20, 2009

(30) Foreign Application Priority Data

Nov. 2, 2004 (GB) .................................. 0424249.1
Jun. 24, 2005 (GB) .................................. 0512876.4

(51) Int. Cl.
*F16K 31/02* (2006.01)
(52) U.S. Cl. .................................. 251/129.11; 251/266
(58) Field of Classification Search ............. 251/129.11, 251/264, 266
See application file for complete search history.

(56) References Cited

U.S. PATENT DOCUMENTS

| 5,176,164 | A | 1/1993 | Boyle | |
|---|---|---|---|---|
| 6,157,103 | A | 12/2000 | Ohta | |
| 6,310,599 | B1 | 10/2001 | Laborde | |
| 6,460,567 | B1 | 10/2002 | Hansen | |
| 6,488,259 | B1 | 12/2002 | Fujita | |
| 7,434,626 | B2 * | 10/2008 | Vick, Jr. ....................... | 166/373 |
| 7,569,959 | B2 * | 8/2009 | Kuwano et al. ............... | 310/148 |
| 7,640,989 | B2 * | 1/2010 | Williamson et al. ........ | 166/332.8 |
| 7,654,333 | B2 * | 2/2010 | Smith .......................... | 166/386 |
| 7,728,479 | B2 * | 6/2010 | Yokoyama et al. ........... | 310/128 |

FOREIGN PATENT DOCUMENTS

| GB | 2390414 A | 1/2004 |
|---|---|---|
| GB | 2401926 A | 11/2004 |

* cited by examiner

Primary Examiner — John Fristoe, Jr.
(74) Attorney, Agent, or Firm — Barnes & Thornburg LLP

(57) ABSTRACT

Actuators and valve-actuator combinations are disclosed which require low power for actuation, and which are particularly suitable for use to control a valve associated with a pipeline. Such an actuator (20) comprises a thrust member (26) moveable between two end of travel positions, an annular rotor having magnetic poles, an annular magnetisable stator having at least one winding and poles with which the rotor poles are aligned in each of a plurality of rotational positions of the rotor relative to the stator, and a drive connection between the rotor and the thrust member which is adapted to convert rotational movement of the rotor into linear movement of the thrust member. The actuator is able to hold its position using minimal energy, and may be located within or around an associated pipe.

34 Claims, 6 Drawing Sheets

Rotation Right (R)

| Coils | A | B | C | D | E | F | G | H |
|---|---|---|---|---|---|---|---|---|
| Current polarity | - | + | + | - | - | + | + | - |
| Stator pole pieces | 186 | 188 | 190 | 192 | 194 | 196 | 198 | 200 |
| Pole pieces polarity | N | S | S | N | N | S | S | N |
| Rotor pole pieces | (N) | | (S) | | (N) | | (S) | |
| Force direction | →188/190 | | →192/194 | | →196/198 | | →200/186 | |

Rotation Left (L)

| Coils | A | B | C | D | E | F | G | H |
|---|---|---|---|---|---|---|---|---|
| Current polarity | + | - | - | + | + | - | - | + |
| Stator pole pieces | 186 | 188 | 190 | 192 | 194 | 196 | 198 | 200 |
| Pole pieces polarity | S | N | N | S | S | N | N | S |
| Rotor pole pieces | (N) | | (S) | | (N) | | (S) | |
| Force direction | 200/186← | | 190/188← | | 194/192← | | 198/196← | |

LOW POWER ACTUATOR AND VALVE-ACTUATOR COMBINATION

FIELD OF THE INVENTION

This invention concerns actuators and valve-actuator combinations which require low power for actuation. More particularly, it concerns devices of these types which can be employed for example to control the opening and closing of a valve in a pipe to control the flow of fluids in the pipe, to cover and uncover an opening in the wall of a pipe, or to permit, to control the rate of, or to prevent flow along a pipe.

BACKGROUND TO THE INVENTION

Oil extraction from the seabed is now substantially more difficult than hitherto, and operators are now forced to follow a 'brownfield' strategy and extract oil from poorly yielding fields. As a consequence a low-cost inflow control valve to manage flows in existing, as well as future multi-lateral installations, is now called for. Additionally environmental and economic considerations, both sub-sea and on the surface, make it increasingly important to have a capability rapidly to shut off flow in the event of pipeline leak or rupture.

Pipes may range in diameter from a few inches to more than three feet. Typically pipes bringing oil to the surface are 5" inside diameter, and inflow control valves may be slid into position along such a pipe and secured in place adjacent an opening in the pipe wall it is to control. In other applications where the valve is to control flow along a pipe, the valve may be installed at the time of pipeline construction, or may be fitted subsequently, within the pipe.

Previously suggested solutions have involved relying on a hydraulic line to operate a valve associated with a pipeline. However, such a line can only function effectively over a limited distance.

The present invention seeks to provide an actuator which is able to hold its position using minimal energy.

The invention also seeks to provide a valve and actuator combination which will operate in an adverse environment in remote locations where there is only limited availability of electric or hydraulic power.

Furthermore, the present invention seeks to provide an actuator, and a valve and actuator combination which can be fitted into and moved along a pipe for positioning as required, in which energy is stored locally to assist operation of the actuator and therefore the opening and closing of the valve.

SUMMARY OF THE INVENTION

The present invention provides an actuator comprises a thrust member moveable between two end of travel positions, an annular rotor having magnetic poles, an annular magnetisable stator having at least one winding and poles with which the rotor poles are aligned in each of a plurality of rotational positions of the rotor relative to the stator, in which the rotor poles remain attracted to a set of stator poles until a current is caused to flow in the at least one winding, which alters the magnetic field acting between the rotor and stator poles sufficiently to cause the former to be repelled from the stator poles with which they are currently aligned and to be attracted to and aligned with another set of stator poles, and a drive connection between the rotor and the thrust member which is adapted to convert rotational movement of the rotor into linear movement of the thrust member.

The actuator may include first spring means which acts on the thrust member and is compressed or stretched from its relaxed length as the rotor rotates such that, while the spring means is at least partly compressed or stretched, the spring force acting on the thrust member combines with the thrust exerted thereon due to the rotation of the rotor through the drive connection to enhance the actuating force exerted by the thrust member.

The invention further provides an actuator comprises a thrust member moveable between two end of travel positions, a rotor having magnetic poles, a magnetisable stator having at least one winding and poles with which the rotor poles are aligned in each of a plurality of rotational positions of the rotor relative to the stator, in which the rotor poles remain attracted to a set of stator poles until a current is caused to flow in the at least one winding, which alters the magnetic field acting between the rotor and stator poles sufficiently to cause the former to be repelled from the stator poles with which they are currently aligned and to be attracted to and aligned with another set of stator poles, first spring means which acts on the thrust member and is compressed or stretched from its relaxed length as the rotor rotates, a drive connection between the rotor and the thrust member which prevents linear movement of the latter under the action of the spring means except when the rotor rotates and is adapted to convert rotational movement of the rotor into linear movement of the thrust member such that, while the spring means is at least partly compressed or stretched, the spring force acting on the thrust member combines with the thrust exerted thereon due to the rotation of the rotor through the drive connection to enhance the actuating force exerted by the thrust member.

This enhancement of the magnetic thrust force will continue until the spring reaches its relaxed length.

In a preferred embodiment of an actuator according to the present invention, the actuator is arranged so as to define a hollow space through it, which extends through a central opening defined by the rotor and/or stator. In use it may be located within a pipe. Alternatively, it may be provided around an associated pipe, with the rotor and stator surrounding (and preferably coaxial with) the pipe, in order to reduce the radial extent of the outline of the actuator. This facilitates its insertion into a borehole. It may be mounted on the outer circumferential surface of a section of pipe which can then be included at an appropriate place in a pipeline. The rotor may be spaced axially from the stator with respect to its axis of rotation.

Preferably, the drive connection converts rotational movement of the rotor into linear movement of the thrust member in a direction substantially perpendicular to the plane of the rotor.

Preferably, the actuator includes control means for supplying pulses of current to the at least one winding so that the rotor can be progressively rotated in one direction or the other.

The control means may be adapted to supply electric current to the stator winding in controlled bursts, each of which causes the rotor to spin at high speed, and the inertia of the rotating rotor is released via a bi-stable drive transmission device between the rotor and the drive connection to provide higher thrust forces than would be created simply by the rotation of the rotor under load.

By successively decoupling the rotor from the drive connection after the inertia is spent, and allowing the rotor to accelerate again before re-establishing the connection between rotor and drive connection, a sequence of impact thrusts can be created.

A succession of such impact thrusts when the spring means is fully compressed (or stretched) will produce a sequence of very high impact thrusts at the beginning of a full movement of the actuator, which will progressively reduce in impact as the spring extends (or becomes less stretched) and the thrust member moves under the action of the rotor rotation.

Preferably, there is a second spring means also acting on the thrust member but in the opposite sense to the first spring means, which will be compressed or stretched in the opposite sense to that of the first spring means when the rotor rotates.

A battery may be incorporated into or located close to the actuator to supply the operating current.

Where there is a second spring means to be compressed (or stretched) as the thrust member moves towards the opposite end of its travel, the control means may be adapted to instigate a similar sequence of high impact thrusts each of which exerts sufficient force on the second spring means to compress (or stretch it) as the thrust member is moved towards and into its other end of travel position.

The actuator may form part of, or act on, a flow control valve, and the invention also provides a combination of actuator as aforesaid and a valve, which can be opened and closed in response to control signals, to control the flow of a fluid through the valve.

Where a valve and actuator combination embodying the invention is to be installed in a pipe for subterranean use, as in oil fields for example to control the flow of oil and other fluids from the field into the pipe, it must be capable of operating at or below the seabed and under the high ambient pressure which exists at those depths.

The invention is not limited to seabed locations and a valve and actuator combination may be located on land or at the surface of the sea for controlling the flow of fluid through a pipe.

The actuator retains or can harness and store energy in the form of potential mechanical energy in the compressed or stretched spring means, as potential magnetic energy in the permanent magnet means, and as electrical energy in a rechargeable battery or other electric energy storage device. All the stored energy can be used for actuating the valve.

A key feature of an actuator embodying the invention is that it only requires electrical power when it is commanded to move. Its power consumption while in a resting state is zero. During actuation, energy used in overcoming friction is expended irrecoverably, but depending on the work required to be done by the actuator during actuation, much of the energy which is converted into movement of a closure device can be recovered, and stored if a second spring means is employed, to assist in subsequent operation of the actuator. In this way, demand for electrical power from a battery or other source can be significantly reduced.

Effectively therefore, where little energy is required to actually move a valve closure device once freed from an open or closed condition, most of the energy required for each operation of the actuator is that required to overcome friction and to accelerate any object (such as a valve closure device) that is to move.

The actuator is particularly suited to operating a sleeve valve.

Such a valve may be incorporated within a cylindrical sleeve containing in one or more annular compartments one or more batteries, the actuator, and the spring means.

Preferably the compartments are sealed against ingress of liquid and may be filled with an incompressible fluid such as an oil, to allow the compartments to withstand excessive crushing pressures as can exist underground and at or below the seabed.

Typically springs are provided at both ends of the section of the sleeve within which the thrust member moves.

It is to be understood that the invention is not limited to actuation of sleeve valves and an actuator as proposed may be applied to valves in which the valve closure is for example a ball or butterfly.

To ensure the valve will open or close on command, it is important that the actuator is capable of overcoming 'stiction' forces between relatively movable parts of the valve, such as relatively slidable members. To this end, a clutch or lost motion connection is preferably provided between a rotor and the thrust member (or between the latter and a valve closure), to allow momentum to be developed by for example rotation of the armature before that movement is applied to move a valve closure device.

Preferably, the design of the valve also permits mechanical operation using an intervention tool, so that it will retain functionality and can be opened or closed mechanically after battery life is exhausted, or in the event of a communication failure, or a battery failure, or damage.

Preferably, the actuator or valve is adapted to be operated using a wireline tool, with only inductive coupling between tool and actuator or valve. This allows long term control of the valve to be envisaged even in a permanently installed situation, where perhaps the battery and/or electronics have failed.

Lithium-ion batteries may be employed as the batteries. However the invention is not limited to the use of any particular battery and renewable energy sources may also be employed.

Depending on the application, the current source may only be required to deliver electrical energy for a relatively small number of actuations (open or close) over a period of as long as five years. In some applications, the number of actuations may be as small as twenty actuations in five years.

Typically, the control means comprises an electronic control circuit which is compatible with being controlled via electromagnetic signalling, or other types of signalling, or by command from a local monitoring system.

It is of course important that such a control circuit will respond to a command to operate even after extended periods of remaining inactive.

A force multiplying means may be provided to magnify the force exerted by the rotor but demagnify its movement. More particularly, a force multiplying means is provided between the rotor and the thrust member. Alternatively, or in addition, a force multiplying means may be provided between the thrust member and a body to be moved by the actuator, such as a valve closure.

The force multiplying/movement demagnifying means may be mechanical, such as a bottle screw, a cam and cam follower arrangement, or a hydraulic pump using the principle employed in a vehicle braking or clutch operating system, where large pedal travel with relatively small force is converted into a much larger force at the brake or clutch cylinder albeit with very much smaller displacement.

In configurations using a hydraulic force multiplying means, the actuator may be operable to hold a valve closure at its fully open or closed positions, or at intermediate positions therebetween.

In a preferred embodiment, the force multiplying means between the thrust member and a valve closure is a hydraulic pump, and the output of the pump is connected to two control valves, the control valves being connectable to respective ports of a further main valve to feed fluid selectively to one or both ports to control the main valve.

Pressure sensing means may be provided in combination with a force multiplying means, where the force multiplying means is in the form of a hydraulic pump, to output a signal responsive to the pressure at the pump output to control means, the control means being able to determine information regarding the valve closure status and/or position therefrom.

Where the valve is such that it will normally remain closed or open for long periods of time in polluted sea water and/or crude oil environment, solid particles such as sediments, and vegetation may penetrate inside the outer sleeve. Corrosion can also occur. Solid particles and corrosion can resist any sliding movement of the inner sleeve within the outer sleeve. It is for that reason that the initial movement of the inner sleeve may require quite a substantial linear force acting between the sleeves to free it.

After the inner sleeve has been freed and axial movement is possible sediments and corrosion will be crushed or moved so permitting ongoing movement of the inner sleeve, and in general much less force is needed to continue the displacement of the inner sleeve as it moves towards another stable position. This, arises because in the majority of applications for this type of valve, the pressure difference across the valve is relatively small, and the valve itself is balanced, meaning that main flow or leakage flow is spread evenly around the inner sleeve.

Incorporating an actuator embodying the present invention in a remote location, which may be inaccessible, to operate a fluid flow control valve, should result in:
Reduction in intervention;
Reduction in workovers;
Reduction in risk and exposure of personnel and associated health and safety issues;
Retro-fit zone control will optimise production with low capital outlay;
Economic use of horizontal and multilateral completions, with the resultant step change in production efficiency, and modest capital outlay;
Reduced environmental risk.

A primary application for the actuator is in the operation of a remotely located valve in an oil well pipeline. In an existing pipeline this can reduce the risk of asset damage in severe cases.

By dimensioning the actuator or the valve and actuator combination so that the device is a sliding fit within or around such a pipeline, or into a borehole, the device can be installed in situ, or for example retrofitted to an existing pipeline.

Embodiments of the invention will now be described by way of example, with reference to the accompanying schematic drawings, wherein.

Figure 1A:
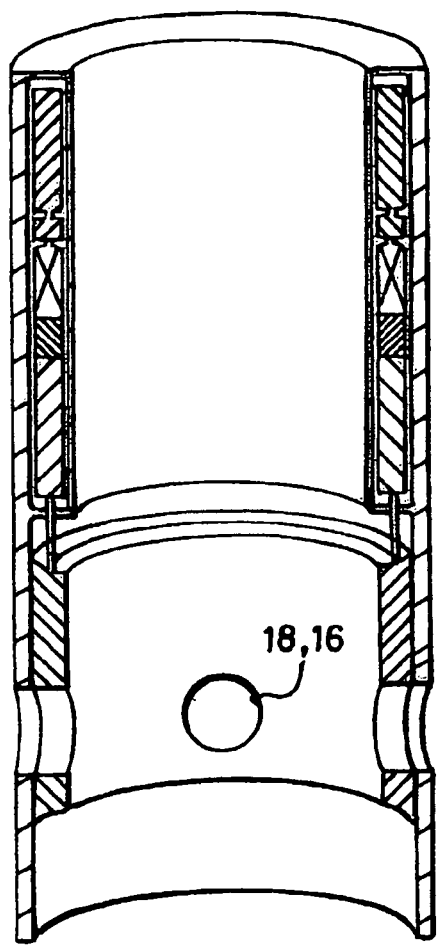
FIGS. 1A and 1B show cross-sectional side views of a valve and actuator combination according to a first embodiment of the invention.
Figure 1B:
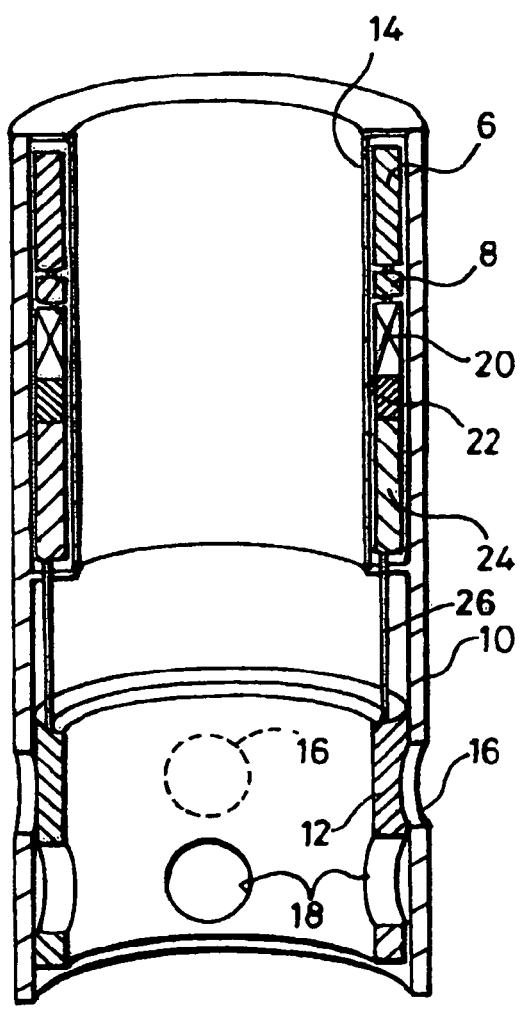

In the embodiment shown in FIGS. 1A and 1B, the valve consists of an outer fixed sleeve 10 and an inner sliding sleeve 12. A sealed compartment 14 is provided at both ends of the outer sleeve. Only one is shown in the drawing. The one at the other end is similar and may be provided merely for symmetry or may also house an actuator arrangement as fitted within 14, as will be described later. Where it houses an actuator, it will operate in the opposite sense on the inner sleeve 12 so that if one acts to drive the sleeve 12 up, the other will act to drive it down.

After installation in a pipeline, the outer sleeve 10 is sealed to the inside of the pipe using contact-expansion seals, for example.

Holes 16, 18 typically of 22 mm diameter are arranged around the circumference of both the inner and the outer sleeves. Fluid can flow therethrough when the sets of holes 16, 18 are aligned. Flow can be prevented by moving the inner sleeve so that the holes 18 no longer align with the holes 16. If the holes are arranged in circular lines around the sleeves, the movement can be radial, so that holes 18 in 12 are rotated out of or into alignment with holes 16 or can be linear (axial) so that the line of holes 18 becomes axially aligned or is moved axially out of alignment with the line of holes 16.

The inner sleeve 12 is moved relative to the outer sleeve 10 to open or close the valve. As shown the actuator drives the sleeve 12 axially, but other actuators may be employed which will merely rotate the inner sleeve 12 relative to the outer sleeve 10, so as to rotationally align or misalign the two sets of holes. In this case the inner sleeve 12 remains axially in the position shown in FIG. 1A.

Within the compartment 14 is arranged a battery 6, a controller 8, an electromagnetically triggered magnetic actuator 20, and a bistable coupling device 22 such as a clutch, which only requires pulses of electrical energy to change it from one stable condition with the plates engaged to its other stable condition with the plates disengaged. A force multiplier 24, such as a bottle screw or similar or a hydraulic drive, which magnifies the force to be transmitted inversely to the displacement, is also located within 14, and an annular thrust member 26 extends between 24 and inner sleeve 12, for transmitting force to the latter to move it axially as required. The force multiplier can either transmit force in a circular sense to assist in circular rotational movement of 12 relative to 10, or can transmit force axially to assist in axial movement of 12 relative to 10.

Permanent magnet means (not shown) within the actuator 20 magnetically locks an armature means (not shown in detail) to hold a spring (not shown) in a compressed state while an opposed spring (not shown) is relaxed.

Valve operation is achieved by the combination of electromagnetic force (which may not be large) and the force obtained when the compressed spring is released, so causing the inner sleeve 12 to slide from a first position to a second position. Total operation time could take up to 30 seconds if a large number of incremental steps are required to extend the spring from its relaxed state, and longer if subsequently it is to compress another spring (not shown).

The battery, electronic control circuit, mechanical linkages, and the spring or springs for storing energy are housed in the or each sealed compartment 14 at one or both ends of the sleeve 10.

The energy stored in the spring or springs combines with the electromagnetic actuator force so as to overcome any initial static friction or 'stiction' forces, which may be considerable if the valve has been left unoperated for a long time, and has become contaminated with solids or corrosion or both.

It has been found that a force of 250 kg will normally be sufficient as an initial impulsive force for freeing a stuck valve of the type used in a pipeline at or below the seabed. However, since operational conditions are difficult to predict, the valve actuator is preferably designed to produce up to 5,000 Newtons (about 510 kg), which is approximately twice the normally expected maximum force needed.

A capacitor may be trickle-charged from a battery or batteries, to provide pulses of current to a solenoid type winding which will influence the magnetic flux linking the or each armature, to incrementally move the latter in response to each capacitor discharge in applications in which valve/actuator combinations provided by the inventor are to be employed.

Incremental armature movement translates into a ratchet action, in which each step is powered by a discharge from the capacitor, so as to progressively compress one of the springs (while allowing the other to relax) so that the former is ready for the next valve actuation. Typically this process could take up to 15 minutes or longer. The actuator then remains in a steady state, drawing no electric power, until it receives the next command to operate by releasing the compressed spring.

Battery capacity is selected so as to provide sufficient current for at least the expected number of complete cycles, preferably with a safety factor of 50% or more.

Battery power is also required for the electromagnetic signalling circuitry, which is preferably TTL input compatible. However, with appropriate circuit design, it should be possible to keep the current drain to the circuitry to very low levels so as to achieve the target of a 5-year life for the valve.

Where battery power is inadequate for such a long period, one or more of the batteries may be of a rechargeable type and the actuator/valve may include means for generating an electric charging current, either from fluid flow in the pipe or by electromagnetic induction from a probe introduced down the pipe when required.

The actuator therefore operates in three modes. In one mode it incrementally compresses a spring to store energy which is then available to assist at least the start of a subsequent actuation. In a second mode it produces a constant but smaller force for driving a thrust member to effect the desired actuation, and in a third mode the compressed spring force is added to the constant smaller driving force produced by the rotor rotating when under load, to assist in dislodging a valve closure from an open or closed condition in which contamination or corrosion is preventing the closure from moving.

Preferably magnetic latching is employed to hold the spring in its compressed condition.

Stretching a spring will also store energy and the invention is not limited to compression of spring(s) but includes arrangements in which a spring or springs is/are instead stretched by the incremental movement of the actuator.

Principal design parameters of a valve/actuator are:—

| | |
|---|---|
| Operating pressure | 10,000 psi ambient |
| Differential pressure | approximately balanced |
| Operating temperature | 150° C. initially, target 200° C. |
| Diameter | 5 inch tubing based |
| Drift diameter | 4.151 inches |
| Minimum internal valve diameter | 3.0 inches |
| Travel | 1 inch (25.4 mm) |
| Length | 60 inches max |
| Force to move sleeve | 5,000 Newtons |
| Maximum actuation time | 30 seconds |
| Minimum interval between actuations | 15 minutes |
| Electrical energy required to hold position | Nil |
| Number of actuations from battery | 20 (10 complete cycles) |
| Housing and valve material | approved stainless steel |

In the event of failure of the battery, an intervention tool on a wireline can be inserted. Using magnetic coupling, the valve closure or actuator can be moved so as to open or close the valve.

Although only a sleeve valve primarily for closing off an inlet from an oilfield into a pipeline has been described in detail, the invention is not limited to such valves. Other types of valve may be operated using the same principle of storing energy over a relatively long period of time in two forms, partly in stored mechanical energy (typically in a compressed or extended spring), and partly as electrical energy. Both types of stored energy are then available to operate an actuator and open or close a valve in response to some signal which may be delivered from a control centre as a result of human intervention or may be automatically generated in response to some change in a parameter, such as pressure or temperature or flow rate linked to the pipeline. Thus, the invention may be employed to operate for example gate valves, ball valves or butterfly valves.

In the alternative embodiment shown in FIGS. 2 and 3, the valve is again comprised of two cylindrical sleeves (100, 102), the inner sleeve (102) being axially slidable within the outer sleeve (100).

A sealed annular housing (104) is located at the upper end of the outer sleeve (100), which contains a battery in a first annular compartment (106) and an electronic controller in an axially spaced annular compartment (108).

Below the compartment (108) is located an annular magnetisable stator 110 around which are arranged a plurality of windings one of which is shown at (112) and another at (114). The windings and stator are also shown in FIG. 3, which is a diagramatic edge view of the stator poles shown in close proximity to those of the annular rotor (or armature) 116. In FIG. 3, the edge view is flattened for the purposes of illustration, although the stator (110) and rotor (116) are curved. The axis about which the rotor rotates is parallel to the plane of the paper containing FIG. 3, as it is also in FIG. 2.

Attached to the underside of the annular rotor (116) is a friction ring (118) so that it rotates with the rotor.

An annular clutch including an annular clutch plate (not shown) is shown at 120. This is rotably fitted around the inner sleeve (102). If the plate is forced into contact with this friction ring (118), the clutch rotates with the rotor.

The clutch has an operating mechanism which is bistable in that energy is only required to move it from an engaged state (with the friction ring (118) and clutch plate (120) in contact) to a disengaged state (in which 118 and 120 are out of contact) and will remain in whichever state it has last been triggered.

The rotor (116) is mounted within cylindrical bearings one of which is shown at (122) fitted within the outer sleeve (100).

The nut 124 is, like the rotor, mounted within cylindrical bearings (128, 130) within the outer sleeve (100), and its internal thread is engaged on an external complimentary screw thread profile (132) formed around an annular enlargement (134) on the outer face of the inner sleeve (102).

The nut (124) extends axially over a greater length than the annular enlargement (134) so that as it is rotated it will axially traverse the threaded enlargement (134).

The inner and outer sleeves (100, 102) are keyed so that whilst the inner sleeve can slide axially relative to the outer, no relative rotation is possible between 100 and 102.

Annular thrust devices (136) and (138) are secured within the outer sleeve (100) and two helical springs (140, 142) are shown trapped in series between them. The springs are in fact separated by a driving ring (144) attached to and extending radially from the inner sleeve (102) so that as the latter slides axially relative to the outer sleeve (100) one spring will become compressed and the other will be allowed to relax. As shown the sleeve (102) is at the lower end of its travel and spring (140) is uncompressed and spring (142) is fully compressed.

Rotation of nut (124) so as to raise the inner sleeve (102) relative to the outer sleeve (100) will gradually cause spring (140) to become compressed and allow spring (142) to expand.

The inner sleeve (102) is carried in a linear bearing (146) which ensures smooth sliding of the sleeve (102) relative to the outer sleeve (100), and allows the sleeve (102) to be a clearance fit within the compartment (104) at the upper end of the sleeve (100) and within the internal face of the lower end of the sleeve (100).

Annular seals at 148, 158 and 152, 154 allow sliding movement of 102 but prevent not only the ingress of liquids but especially particulates/solids such as sand.

Figure 2:
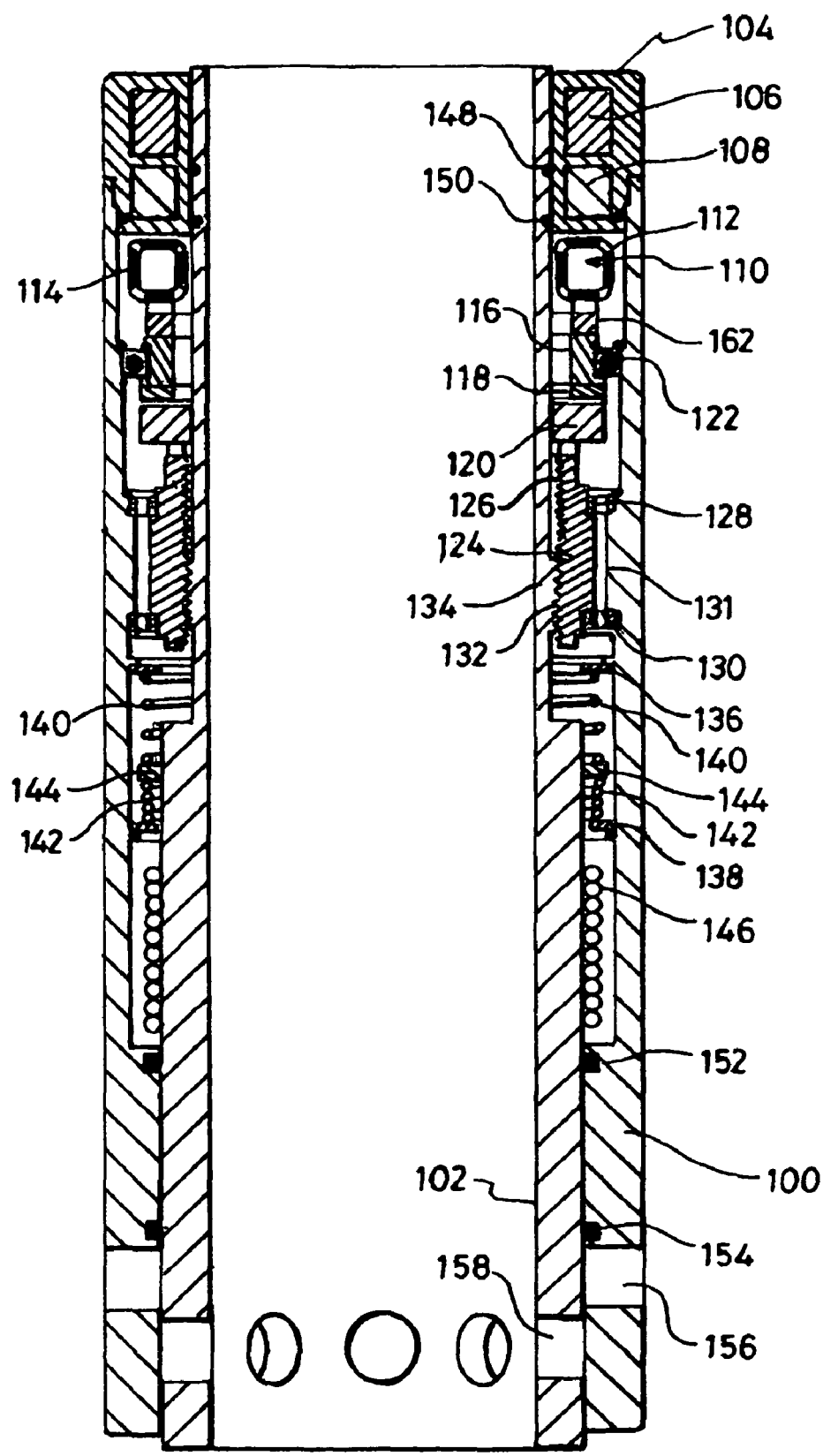
FIG. 2 shows cross-sectional side views of a valve and actuator combination according to a second embodiment of the invention.
Figure 3:
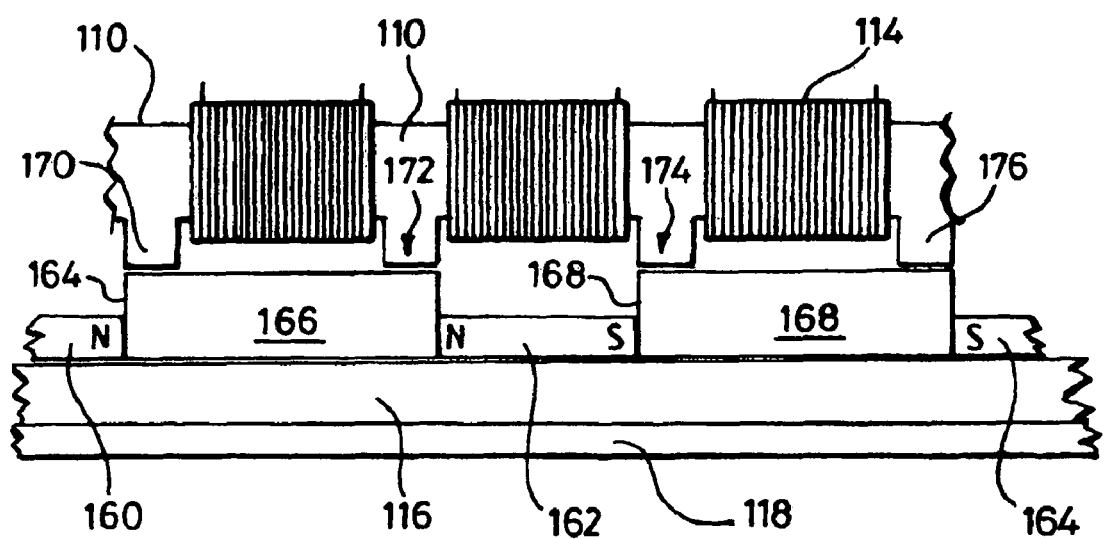
FIG. 3 shows a partial diagrammatic view of the rotor and stator of the actuator of FIG. 2.

As previously mentioned, the valve shown in FIG. 2 is adapted to be pushed along a cylindrical pipeline within which it is a loose sliding fit, until the ring of openings (156) in the outer sleeve register with one or more similar openings in the wall of the pipeline (not shown). At this point the outer sleeve (100) is secured in position within the pipeline using a contact expansion seal or the like (not shown).

The inner sleeve has a similar ring of openings (158), which circumferentially align with those in the outer sleeve, but can be displaced axially out of alignment with the openings (156) by axial sliding of the inner sleeve (102) relative to the outer sleeve (100), as previously described.

In the scrap view of FIG. 3, permanent magnets (160, 162, 164 etc.) are shown mounted around the rotor (116) between poles (166, 168, etc.). In this arrangement the rotor itself is constructed from non-magnetisable material.

The poles (166, 168 etc.) are spaced around the rotor (116) in a similar manner to the spacing of poles (170, 172, 174, 176, etc.) which protrude axially from the underside of the magnetisable stator ring (110). Windings such as 114 are located between the poles (170, 172 etc.) and are connected by cables to the control unit (108) so that current can be supplied thereto, when required, to alter the magnetic polarity of the stator poles and cause the rotor to rotate until the fixed magnetic polarity rotor-poles align with oppositely magnetically polarised stator-poles.

Since the magnets (160, 162 etc.) are permanent and produce a powerful magnetic field between the adjoining stator and rotor poles, once the rotor has rotated into registry with another set of stator poles, the current to the windings can be removed. The powerful magnetic field in the air gaps between the stator and rotor poles serves to lock the rotor rotationally relative to the stator. This locking is sometimes referred to as cogging and is not a positive mechanical lock but with appropriate choice of air gap, magnetic materials and strength of the magnets (160, 162 etc.), a very high torque will be needed to rotate the rotor from a cogged position to the stator. Put another way, the magnetic cogging force acts like a friction brake on the rotor.

As previously mentioned, an actuator embodying the invention enables a substantial linear force to be generated by combining three energy sources so as that all act together for some of the time. The three comprise spring energy, the inertia of a rotating rotor, and electric energy from the battery.

Figures 4, 4A, 4B:
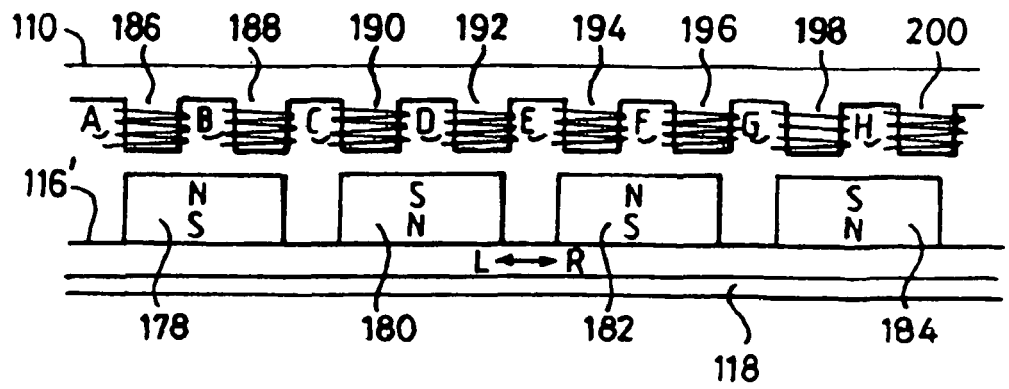
FIG. 4 shows a diagrammatic view of an alternative rotor and stator configuration to that of FIG. 3.
FIGS. 4A and 4B are tables indicating how the coils shown in FIG. 4 are energised in use.

In the scrap view of FIG. 4, permanent magnets (178, 180, 182, 184) are shown mounted around the rotor (116) with alternating polarity. Preferably, each rotor pole is associated with two stator poles. In this example, four rotor poles are provided. The rotor (116) is constructed from magnetisable material preferably a ferromagnetic material, as opposed to the non-magnetic material from which the rotor (116) in FIG. 3 can be constructed.

Also shown in FIG. 4 is the stator ring (110) which is also constructed from magnetisable material.

Eight poles (186, 188, - - - 198, 200) protrude axially from the underside of the stator ring (110). Windings A-H are located around the stator poles and are connected by cables to the control unit (108) so that current can be selectively supplied thereto, as required, to magnetically polarize the stator poles so as to cause the rotor to slide to the left or the right until each permanent magnet rotor-pole once again aligns with a pair of stator-poles.

Since the rotor poles (178, 180 etc.) are permanent magnets and the air gap between rotor and stator poles is small, a powerful magnetic field exists between the adjoining stator and rotor poles and once the rotor has rotated into registry with another set of stator poles, the current to the windings (A, B, C, etc.) can be removed. As with the FIG. 3 arrangement, the powerful magnetic field in the air gaps between the stator and rotor poles serves to lock the rotor rotationally relative to the stator (sometimes referred to as cogging), and as with FIG. 3, this is not a positive mechanical lock but with appropriate choice of air gap, magnetic materials and magnetic strength of the magnets (178, 180 etc.), a very high torque will again be needed to rotate the rotor from a cogged position.

The tables in FIGS. 4A and 4B indicate how the coils in FIG. 4 are to be energised and the direction of rotation is achieved.

Compressed spring (142) acts directly on a ring (144) attached to the inner sleeve (102). The inertia energy in the fast rotating rotor (116) and friction disc (118) is added to the spring force as soon as the rotating components are connected via the bi-stable clutch (120) to the rotatable nut (124).

The latter is mounted within the outer sleeve in bearings (128, 130) axially separated by a spacer (131), and the nut (124) is axially located by the bearings so that relative linear (axial) movement between it and outer outer sleeve. (100) is prevented. In this way, the rotatable nut (124), which is coupled to the inner sleeve (102) by means of interengaging threads (126, 132), provides substantial linear force pushing the inner sleeve (102) axially along the outer sleeve (100). This interengagement creates a force multiplying effect.

The sum of the three sources of energy when the clutch is engaged provides a sudden axial force or impulse, which will normally initiate movement of the inner sleeve relative to the outer to begin valve closure or opening.

In cases of severe contamination in which the inner sleeve is so jammed within the outer sleeve that on initial engagement of the clutch (120) there is significant resistance to axial movement of the sleeve, the clutch can be disengaged to allow the rotor to run up to speed before engaging the clutch again, and the process can be repeated until the bond created by the contamination or corrosion is broken as the impact forces crush and move away any movement-locking sediments.

Freeing the sleeves will be referred to as a first phase of the actuator movement.

Thereafter rotation of the battery driven rotor, acting through the interengaging threads, together with the remaining energy stored in the spring (142), provides enough axial force to continue to move the inner sleeve (102) axially within the outer sleeve.

This will be referred to as the second phase of the actuator movement. It occurs as the inner sleeve continues to move relative to the outer sleeve, now largely free from friction, using electric energy from the battery to rotate the rotor and maintain axial movement of the thrust member even after the spring force which assists in the initial movement has reduced to zero.

During a third and final phase of the movement, the second spring (140) becomes compressed so as to store energy to be available to assist reverse movement of the inner sleeve at a future time.

It is unlikely that the battery will have the capacity to provide the energy to perform this compression by rotating the rotor under the increasing load created as the spring is compressed, and this final phase will probably be performed over an extended period of time, by making use of the inertia in the rotating rotor and friction disc once again.

In order to do so, the clutch is disengaged to clear the rotor and allow it to spin up to speed, after which the clutch is engaged, and the combination of the inertia energy and the continuing torque created by the electric current from the battery flowing in the stator windings acts via the high ratio gearing of the interengaging threads to begin to compress the spring. As soon as the inertia energy is exhausted and the rotor decelerates under load, the clutch is disengaged, the rotor is free to spin up to speed again, and the process of re-engaging and then disengaging the clutch is repeated.

In theory there is no limit to how many times this process of clutch engagement and disengagement can be performed, but typically the most efficient driving strategy is determined by the control means (108) and is adopted and executed in a flexible way as appropriate.

Once the inner sleeve reaches its final position at which the spring (140) is now fully compressed, there is no further requirement for electric current from the battery.

The valve position is secured by the permanent magnet locking effect between rotor and stator created by the permanent magnet and the plurality of interacting rotor and stator poles. As previously described the magnetic poles create a cogging effect so that the rotor has a large number of positions in each of which it will be held stationery by the magnetic cogging effect. Since the magnets are permanent, the rotor will remain in any one of these stable positions without the need for electrical energy to be supplied, in the same way as the rotor of a stepper motor is held stationary.

To further save battery energy, the controller (108) is adapted to revert into a sleep mode requiring virtually zero power, after the inner sleeve has reached a final end position. However, since it is necessary to be able to trigger the control means into activity when the actuator is next to operate, a communication monitoring system within the controller (108), albeit requiring only a minute current to keep it operating, remains electrically active until the device is next required to operate.

When a request signal is received to change the valve position, the controller (108) can thereby be reactivated.

Where the valve and actuator are to be located and operated in a high ambient pressure environment, the internal actuator mechanism is sealed with double seals (148, 150) and (152, 154) and any space between the sleeves is filled with a clean, air-free incompressible fluid such as an oil. In this way the actuator and seals are largely protected against mechanical damage due to high ambient pressure, as could otherwise occur.

The invention may therefore provide a valve and actuator combination which will operate in an adverse environment in remote locations where there is only limited availability of electric or hydraulic power.

Figure 5:
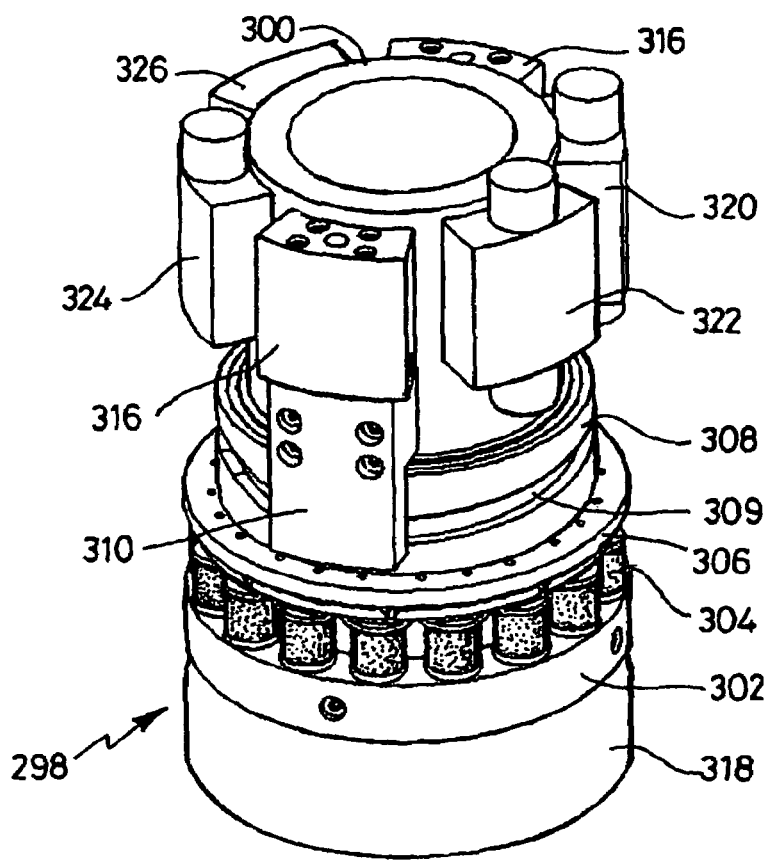
FIG. 5 is a perspective side view of an actuator according to a second embodiment of the invention.

Another actuator configuration 298 embodying the present invention is shown in FIG. 5. It is arranged so as to be mounted around a pipe 300 and fit within an annular volume surrounding the pipe, so that it can pass along and be installed in a borehole with the pipe. Pipework and wiring associated with the actuator itself have been omitted from FIG. 5 for the purposes of clarity.

The actuator has an annular stator 302 which includes a plurality of poles spaced around it and extending axially from it that have respective coils 304 associated with them. The stator poles face pole pieces and magnets of a rotor 306, in a similar manner to preceding embodiments. A sleeve 308 has a circumferential groove formed in its outer surface which defines an annular cam 309. The sleeve is mounted on or integrally formed with part of rotor 306, and are together rotatably supported on pipe 300 by bearings 307.

Within a housing 310 on each side of the actuator, a plunger pusher 312 is mounted so as to be axially slideable. A cam follower pin 304 extends radially inwards from the plunger pusher so as to engage with cam 308. Plunger pusher 312 is connected to a plunger 314 which extends axially out of housing 310 and into a pump assembly 316. Plunger pusher 312 and plunger 314 together form a thrust member.

The two cam follower pin and plunger assemblies are provided on opposite sides of the actuator to exert balanced, symmetrical forces on the rotor, for smoother operation.

A pack 318 containing electronic control means and a battery pack for the actuator is provided adjacent to the stator 302.

As shown in FIG. 5, alongside the pump assemblies 316, two dual valves 320 and 322, a single valve 324 and a hydraulic fluid reservoir 326 are circumferentially spaced around the pipe. Their function will be described with reference to FIG. 7.

In use, the pump assemblies 316 are coupled to a main valve (not shown) which is arranged to control flow associated with the pipe 300. Rotation of rotor 306 by energising poles of stator 302 as described above rotates cam 308, which in turn displaces cam pin 314, plunger pusher 312 and plunger 314 axially. This increases the pressure in pump assembly 316. Each rotation of rotor 306 creates a high pressure pulse in the pump assembly which is employed to operate the main valve.

Figure 6:
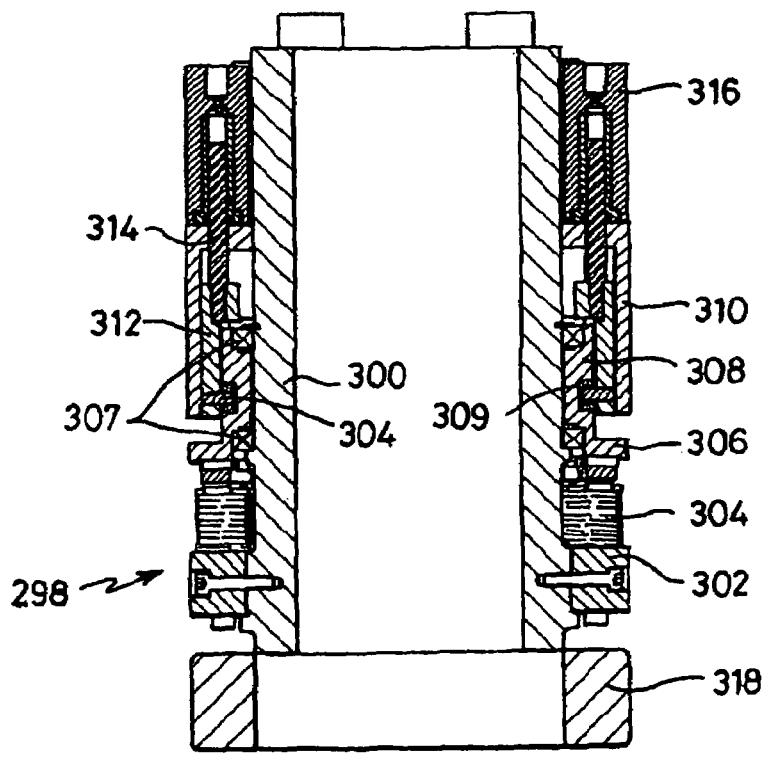
FIG. 6 is a cross-sectional side view of the actuator of FIG. 5.

The actuator illustrated in FIGS. 5 and 6 employs two force multipliers to develop a large actuation force, which may be required to dislodge a main valve closure stuck in position following a long period of inactivity for example. To operate a big hydraulic sleeve valve for example, substantial force is required, typically in the region of 5000N to 50000N.

The first force multiplier is a mechanical one where the angle of the rotating cam acts like a wedge. In this case, the linear tangential pulling force is multiplied by the wedge ratio, which in this case, where two synchronous pumps are used, is equal one quarter of the annular cam length divided by the plunger linear travel distance. Taking a 100 mm rotor diameter and 9 mm plunger linear travel, the ratio is about 9.

The second force multiplier is hydraulic. Plunger 314 is relatively small, typically 5 to 10 mm diameter or 20 to 80 $mm^2$ plunger area, and is hydraulically connected with a large piston of the main valve, typically having an area of 1500 to 2000 $mm^2$. The force multiplication ratio is equal to the piston plunger area ratio, which in this example is in the region of 25 to 75.

In this example, the total force multiplication could be in the region of 225 to 675. This way, using a 500 times force multiplier, 1 tonne or 10000N force can be achieved with 2 kg or 20N rotating force. In a preferred embodiment, the rotating force is generated by 16 coils. Therefore only 0.12 kg or 1.2N force per coil is needed to achieve a substantial pulling force to operate the main sleeve valve.

In some situations, when the main valve is exposed to sea water for a long time, solidified sediments can make it difficult to initiate the valve movement. To overcome this problem, the force multipliers can be supported by effective use of rotor inertia. It would be beneficial to start running the annular motor with a high pressure release valve open. Therefore the annular motor can gain some rotation speed because the pumps are running freely. In this way, kinetic energy of the rotor can be steadily built up. At a certain moment, the release valve is closed and both pumps are driven with additional strength provided by inertia. The pressure is built up almost instantly to level sufficient to overcome stiction of the sleeve valve. In some cases as much as 5000 psi hydraulic pressure is needed. Once the sleeve valve starts moving, almost 10 times less hydraulic pressure is needed to maintain the valve movement, typically 500 psi. Such a modest pressure can be easily obtained from pumps driven by the battery powered annular actuator.

Figure 7:
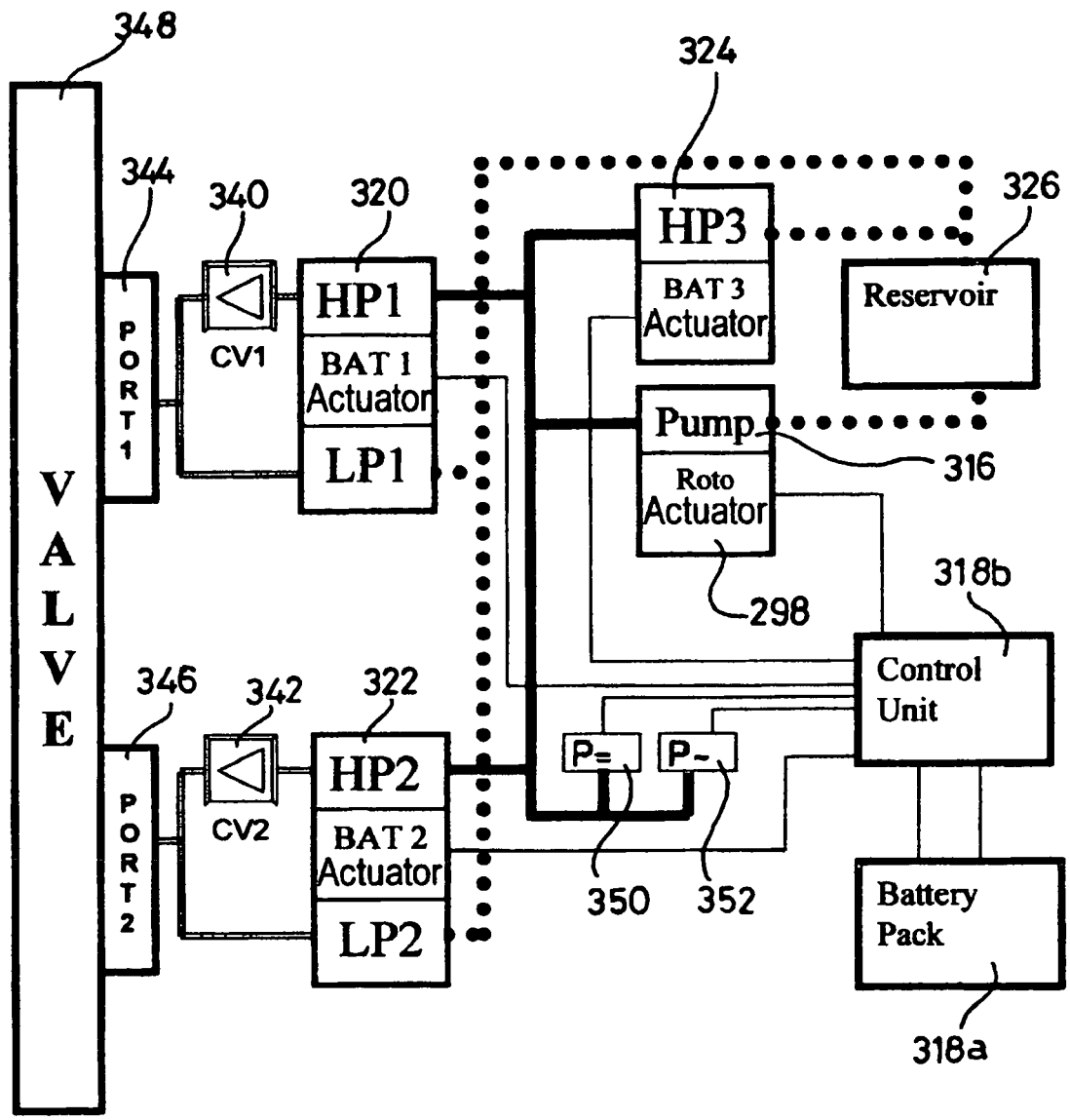
FIG. 7 is a block diagram representing a hydraulic force multiplier for use in combination with the actuator of FIGS. 5 and 6.

FIG. 7 is a block diagram of the hydraulic pump force multiplier of the actuator 298 shown in FIGS. 5 and 6. Single valve 324 is a high pressure release valve. Dual valves 320 and 322 have high and low pressure fluid paths. The high pressure paths are connected (via high pressure supply lines shown by solid lines in FIG. 7) to the pump assemblies 316 of actuator 298. The low pressure return paths are connected (via low pressure lines shown as dotted lines) back to reservoir 326. The outputs of the high pressure paths through valves 320 and 322 are connected via respective check valves 340 and 342 to respective hydraulic ports 344 and 346 of a main valve 348, which is in the form of a push-pull type sleeve valve, for example. The battery pack 318a and control unit 318b of the pack 318 shown in FIGS. 5 and 6 are shown separately in FIG. 7.

By selectively applying high pressure pulses via the ports 344, 346, the actuator can move the valve closure (not shown) of main valve 348 one way or the other, lock it in a given position, or leave it floating and freely moveable for maintenance purposes, for example.

In FIG. 7, two pressure sensors are shown as coupled to the high pressure line, a DC sensor 350 and an AC sensor 352. Signals generated by these sensors are fed back to control unit 318b to provide information regarding the status and/or position of the valve closure of main valve 348.

For example, as noted above, an initial very high pressure pulse may be employed to dislodge the valve closure. However, if the sensors indicate that the initial high pressure does not fall away, this suggests that the closure may still be jammed. It may then be appropriate to reapply a relatively large magnitude pulse using momentum built up again by the rotor, as discussed above.

Once the valve closure is moving under the control of the actuator, each rotation of the actuator rotor will generate two pressure pulses, as each pin 304 follows the two axial oscillations of the cam surface 309 per rotation. The control means may count these pulses to determine the position of the valve closure of main valve 348.

The invention claimed is:

1. An actuator comprising a thrust member moveable between two end of travel positions, an annular rotor having magnetic poles, an annular magnetisable stator having at least one winding and poles with which the rotor poles are aligned in each of a plurality of rotational positions of the rotor relative to the stator, in which the rotor poles remain attracted to a set of stator poles until a current is caused to flow in the at least one winding, which alters the magnetic field acting between the rotor and stator poles sufficiently to cause the former to be repelled from the stator poles with which they are currently aligned and to be attracted to and aligned with another set of stator poles, and a drive connection between the rotor and the thrust member which is adapted to convert rotational movement of the rotor into linear movement of the thrust member, wherein the actuator is arranged so as to define a flowpath through it, which extends through the rotor and stator.

2. An actuator as claimed in claim 1, including first spring means which acts on the thrust member and is compressed or stretched from its relaxed length as the rotor rotates such that, while the spring means is at least partly compressed or stretched, the spring force acting on the thrust member combines with the thrust exerted thereon due to the rotation of the rotor through the drive connection to enhance the actuating force exerted by the thrust member.

3. An actuator as claimed in claim 2, wherein a second spring means also acts on the thrust member, but in the opposite sense to the first spring means, which will become compressed as the first spring means extends due to movement of the thrust member towards one of its end of travel positions, and vice versa.

4. An actuator as claimed in claim 3, including control means for supplying pulses of current to the at least one winding so that the rotor can be progressively rotated in one direction or the other.

5. An actuator as claimed in claim 4, wherein the control means is adapted to instigate a sequence of high impact thrusts, each of which exerts sufficient force on the second spring means to compress it as the thrust member is moved to its other end of travel position.

6. An actuator as claimed in claim 4, wherein the control means is adapted to supply electric current to the stator winding in controlled bursts, each of which causes the rotor to spin at high speed, and the inertia of the rotating rotor is released via a bi-stable drive transmission device between the rotor and the drive connection to provide higher thrust forces than would be created simply by the rotation of the rotor under load.

7. An actuator as claimed in claim 6, wherein the rotor is successively decoupled from the drive connection after the inertia is spent, thereby allowing the rotor to accelerate again before re-establishing the connection between rotor and drive connection, so that a sequence of impact thrusts is created.

8. A combination of an actuator as claimed in claim 2, and a valve, which valve can be opened and closed by the actuator to control the flow of a fluid through the valve.

9. A valve and actuator combination as claimed in claim 8 adapted to operate at or below the seabed and under the associated high ambient pressure.

10. A valve and actuator combination as claimed in claim 8 which is arranged to control fluid flow into or out of a pipe, wherein the pipe is electrically conductive, and operation of the actuator can be instigated by electromagnetic signals or by using the pipe as a conductor of electricity.

11. A valve and actuator combination as claimed in claim 8, wherein the actuator stores energy in the form of potential mechanical energy in the compressed (or stretched) spring means, as potential magnetic energy in permanent magnet means, and/or as electrical energy in an electric energy storage device, and the stored energy is available to actuate the valve.

12. A valve and actuator combination as claimed in claim 11, wherein kinetic energy of the actuator thrust member and valve closure is recovered during actuation and stored in the second spring means, to assist in subsequent operation of the actuator.

13. A valve and actuator combination as claimed in claim 8 wherein the valve is a sleeve valve.

14. A valve and actuator combination as claimed in claim 8, wherein the valve is incorporated within the cylindrical outline of a sleeve containing at least one annular compartment containing the actuator.

15. A valve and actuator combination as claimed in claim 14, wherein the art least one compartment is sealed against ingress of liquid.

16. A valve and actuator combination as claimed in claim 15, wherein the at least one compartment is filled with an incompressible fluid, to allow the compartment to withstand high pressures as can exist underground and at or below the seabed.

17. A valve and actuator combination as claimed in claim 14, wherein springs are provided at both ends of the section of the sleeve within which the thrust member moves.

18. A valve and actuator combination as claimed in claim 8, in which the actuator or the valve can be operated using an intervention tool, so that it will retain functionality and can be opened or closed mechanically, after battery life is exhausted, or in the event of a communication failure, battery failure, or damage.

19. A valve and actuator combination as claimed in claim 18, wherein the actuator or valve is adapted to be operated using a wireline tool, with only inductive coupling between tool and actuator or valve, to allow long term control of the valve even in a permanently installed situation where the battery and/or control system have failed.

20. A valve and actuator combination as claimed in claim 8, wherein the valve and actuator is a sliding fit within or around an oil well pipeline.

21. A valve and actuator combination as claimed in claim 20, wherein the combination is retrofitted to an existing pipeline.

22. An actuator as claimed in claim 1, wherein an electric energy storage device is incorporated into or located close to the actuator to supply the operating current.

23. An actuator as claimed in claim 22, wherein the storage device is a rechargeable device.

24. An actuator as claimed in claim 22, wherein the storage device is a Lithium-battery.

25. An actuator as claimed in claim 1 which forms part of, or acts on, a flow control valve.

26. An actuator, or a valve and actuator combination, as claimed in claim 1, including a clutch or lost motion connection between the rotor and the thrust member, or between the thrust member and a valve, to allow momentum to be developed by rotation of the rotor before that movement is applied to move a valve closure.

27. An actuator, or valve and actuator combination, as claimed in claim 1, in which a force multiplying means is provided to magnify the force exerted by the rotor but demagnify its movement.

28. An actuator, or valve and actuator combination, as claimed in claim 27, wherein a force multiplying means is provided between the rotor and the thrust member.

29. An actuator, or valve and actuator combination, as claimed in claim 28, wherein the force multiplying means is provided by the drive connection of the actuator.

30. An actuator, or valve and actuator combination, as claimed in claim 27, wherein a force multiplying means is provided for operation between the thrust member and a body to be moved by the actuator.

31. An actuator, or valve and actuator combination, as claimed in claim 27, wherein the force multiplying means is in the form of a bottle screw, a cam and cam follower, or a hydraulic pump.

32. An actuator, or valve and actuator combination, as claimed in claim 31, wherein the force multiplying means between the thrust member and a valve closure is a hydraulic pump, and the output of the pump is connected to two control valves, the control valves being connectable to respective ports of a further valve to feed fluid selectively to one or both ports to control the valve.

33. An actuator, or valve and actuator combination, as claimed in claim 31, wherein the force multiplying means between the thrust member and a valve closure is a hydraulic pump, and the output of the pump is coupled to pressure sensing means for outputting a signal responsive to the pressure at the pump output to control means, the control means being able to determine information regarding the valve closure status and/or position therefrom.

34. An actuator comprising a thrust member moveable between two end of travel positions, a rotor having magnetic poles, a magnetisable stator having at least one winding and poles with which the rotor poles are aligned in each of a plurality of rotational positions of the rotor relative to the stator, in which the rotor poles remain 20 attracted to a set of stator poles until a current is caused to flow in the at least one winding, which alters the magnetic field acting between the rotor and stator poles sufficiently to cause the former to be repelled from the stator poles with which they are currently aligned and to be attracted to and aligned with another set of stator poles, first spring means which acts on the thrust member and is compressed or stretched 25 from its relaxed length as the rotor rotates, and a drive connection between the rotor and the thrust member which prevents linear movement of the latter under the action of the spring means except when the rotor rotates and is adapted to convert rotational movement of the rotor into linear movement of the thrust member such that, while the spring means is at least partly compressed or stretched, the spring force acting on the 30 thrust member combines with the thrust exerted thereon due to the rotation of the rotor through the drive connection to enhance the actuating force exerted by the thrust member, wherein the actuator is arranged so as to define a flowpath through it, which extends through the rotor and stator.

\* \* \* \* \*